No. 887,497. PATENTED MAY 12, 1908.
L. A. McCREARY.
FEED REGULATOR FOR COTTON GINS.
APPLICATION FILED JUNE 25, 1907.
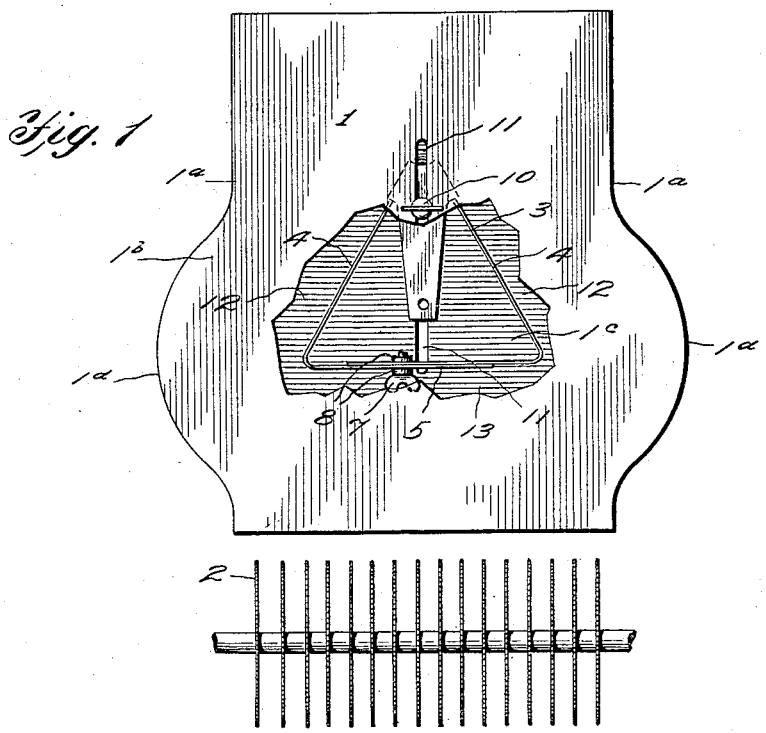
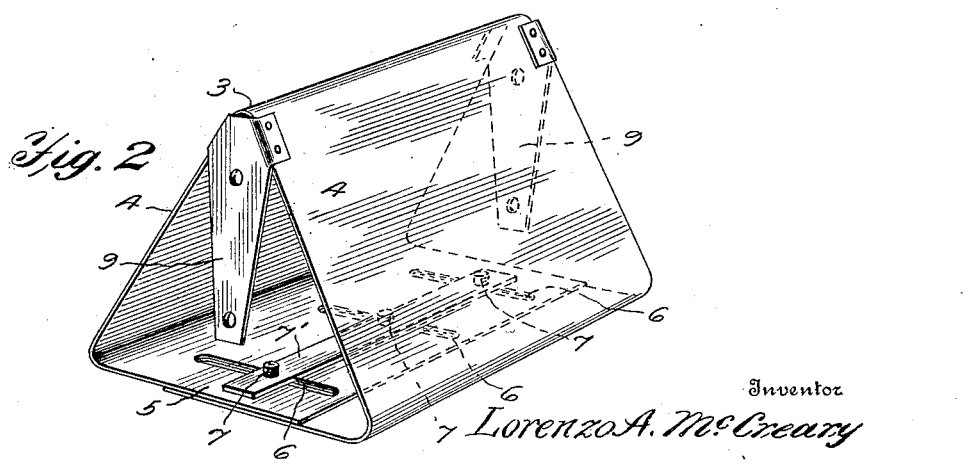
Inventor
Lorenzo A. McCreary
Witnesses
By Victor J. Evans
Attorney

UNITED STATES PATENT OFFICE.

LORENZO A. McCREARY, OF ROCKWOOD, TEXAS.

FEED-REGULATOR FOR COTTON-GINS.

No. 887,497.  Specification of Letters Patent.  Patented May 12, 1908.

Application filed June 25, 1907. Serial No. 380,688.

*To all whom it may concern:*

Be it known that I, LORENZO A. MC-CREARY, a citizen of the United States of America, residing at Rockwood, in the county of Coleman and State of Texas, have invented new and useful Improvements in Feed-Regulators for Cotton-Gins, of which the following is a specification.

This invention relates to cotton gins, and particularly to a divider or deflector designed to be arranged in the feed passage or hopper of the gin to guide and regulate the feed of the cotton to the ginning saws.

The main object of the invention is to provide a device of this character for distributing and guiding the feeding cotton to the saws in such a manner as to secure a quicker ginning action and a more effective separation of the seed from the cotton.

A further object is to provide a device of this character which is adjustable to regulate the feed or for application to gins of different sizes.

In the accompanying drawing:—Figure 1 is an elevation of the hopper of a cotton gin showing the application of the invention, said hopper being partially broken away to show the deflector. Fig. 2 is a perspective view of the regulator or deflector.

Referring to the drawings, the numeral 1 designates the hopper or feed passage of a cotton gin, below the outlet end of which are arranged the ginning saws 2 in the usual manner. Ordinarily the cotton feeding from the hopper passes in bulk downwardly to the saws with obvious disadvantages. In carrying my invention into practice, I provide a feed regulator, divider or deflector 3 arranged in the hopper or feed passage in such a manner as to divide up the feeding cotton into a plurality of streams or columns, whereby a quicker ginning action and a more effective separation of the seed from the cotton are secured.

The regulator or deflector 3 is preferably of triangular form, or so constructed as to provide sloping sides 4 and a horizontal base 5 arranged above the saws and extending across the point of intersection of the acting portions of the saws. In the form of the invention shown, the deflector is constructed of sheet metal folded to form the inclined sides 4 and having its longitudinal side edges arranged to extend inwardly and overlap to form the base 5, the lapping portions being formed with longitudinal slots 6, through which pass fastening screws 7 engaging clamping bars 7' on the upper and lower surfaces of the bottom for clamping said lapping portions in adjusted position. The flexibility of the metal will permit the sides 4 to be adjusted in and out to regulate the size of the gradually narrowing feed passages formed between the same and the side walls $7^a$ of the hopper 1, as well as to increase and decrease the effective width of the base 5. The ends of the deflector may be suitably secured to the opposite end or front and rear walls of the hopper or to any other suitable frame or support, but in the present instance, I have shown the deflector provided at front and rear with arms 9 depending from the apex thereof, which arms are apertured for passage of bolts 10 passing through slots 11 in the front and rear wall $1^b$ and $1^c$ of the hopper, whereby the hopper is rendered vertically adjustable. It will thus be seen that the deflector extends longitudinally between the front and rear walls $1^b$ and $1^c$ of the hopper 1, with its apex arranged in the upper portion of the hopper in the central lines thereof, while the sides 4 of the deflector divide the interior of the hopper to produce feed passages 12 between said sides and the side walls $1^a$ of the hopper, which passages communicate at their lower ends with a horizontal transverse space or passage at the bottom of the hopper and below the bottom of the deflector. The cotton is consequently divided into two streams, passing respectively down the two passages 12 into the communicating lower space or passage 13. In order to increase the lateral extent or width of the passages 12, the side walls $1^a$ of the hopper may be provided with outwardly flaring or bulged portions $1^d$, facing the lower portions of the inclined deflector walls 4, thus allowing streams of cotton to take an outward course of movement before discharging through the lower ends of the passages 12. By the adjustability of the bottom portion of the deflector, the inclinations of the walls 4 and the width within prescribed limits of the passages 12 may be regulated to increase or decrease the width of the flowing streams of cotton, while by the vertical adjustment of the deflector the depth of the space or passage 13 may be regulated, and the distance between the bottom of the deflector and upper edge of the ginning saws varied, as occasion may require.

The cotton in the hopper will be divided by the deflector into two columns or streams which will feed downward through the passages 12 and thence inwardly through the passages 13 between the base 5 and upper edges of the saws 2. In this operation, it will be understood that the two streams of cotton will engage the upper edges of the rotating saws, and by thus dividing out and feeding the cotton the extent and range of ginning is increased without varying in any manner the construction of the gin.

Having thus described the invention, what is claimed, is:—

1. The combination with the hopper or feed chute and the saws of a gin, of a deflector arranged within the hopper and provided with inclined sides and a base arranged to form feed passages for the downflow of the cotton through the hopper and the inward passage of the columns of cotton in contact with the upper edges of the rotating saws.

2. The combination, in a cotton gin, of a hopper, saws below the hopper, and a deflector in the hopper having inclined sides arranged in converging relation to the walls of the hopper and a base extending over the crossing planes of the saws.

3. In a cotton gin, the combination of a hopper, saws arranged below the hopper, and a triangular deflector arranged within the hopper with its base disposed at the bottom of the hopper above the saws.

4. In a cotton gin, the combination of a hopper, ginning saws below the hopper, a triangular deflector arranged within the hopper, and means for regulating the width of the deflector.

In testimony whereof, I affix my signature in presence of two witnesses.

LORENZO A. McCREARY.

Witnesses:
W. D. WENTZ
J. C. KING.